United States Patent
Crocker

(10) Patent No.: US 6,854,420 B2
(45) Date of Patent: Feb. 15, 2005

(54) LIVESTOCK DRINKING DEVICE

(76) Inventor: Graham Stuart Crocker, Manor Farm, Pulham, Dorchester, Dorset (GB), DT2 7EE ( * ) Notice: Subject to any disclaimer, the term of this patent is extended or adjusted under 35 U.S.C. 154(b) by 0 days.

(21) Appl. No.: 10/358,401

(22) Filed: Feb. 5, 2003

(65) Prior Publication Data

US 2003/0145797 A1 Aug. 7, 2003

(30) Foreign Application Priority Data

Feb. 6, 2002 (GB) .............................. 0202724

(51) Int. Cl.[7] ................................. A01K 7/06
(52) U.S. Cl. ...................................... 119/72
(58) Field of Search ............................ 119/71, 72, 72.5, 119/81

(56) References Cited

U.S. PATENT DOCUMENTS

| 2,775,227 | A | * | 12/1956 | Millies | 119/72.5 |
| 3,042,002 | A | * | 7/1962 | Liell | 119/71 |
| 4,188,914 | A | | 2/1980 | Lage | 119/71 |
| 5,099,798 | A | | 3/1992 | Ohara | 119/80 |
| 5,188,061 | A | * | 2/1993 | Lombardi | 119/71 |
| 6,619,231 | B2 | * | 9/2003 | Darby et al. | 119/72 |

FOREIGN PATENT DOCUMENTS

| DE | 2841024 | 8/1980 |
| EP | 0030799 | 6/1981 |
| GB | 904991 | 9/1962 |
| GB | 977313 | 12/1967 |
| GB | 2307839 | 6/1997 |

* cited by examiner

Primary Examiner—Robert P. Swiatek
(74) Attorney, Agent, or Firm—Nixon & Vanderhye P.C.

(57) ABSTRACT

A device, for delivering liquid to livestock, comprising a container (1) for liquid, the container being suspendable within a livestock feeding area, and having a plurality of nipples (10), arranged on a lower surface of the container, such that livestock can drink liquid from within the container via the nipples.

13 Claims, 3 Drawing Sheets

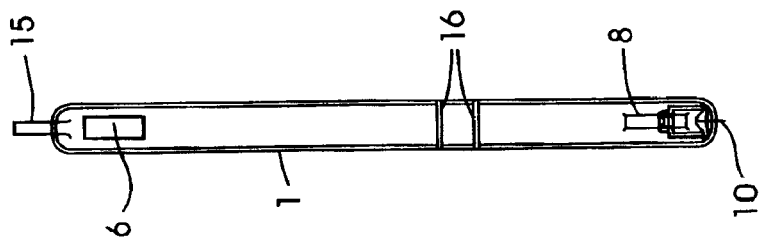
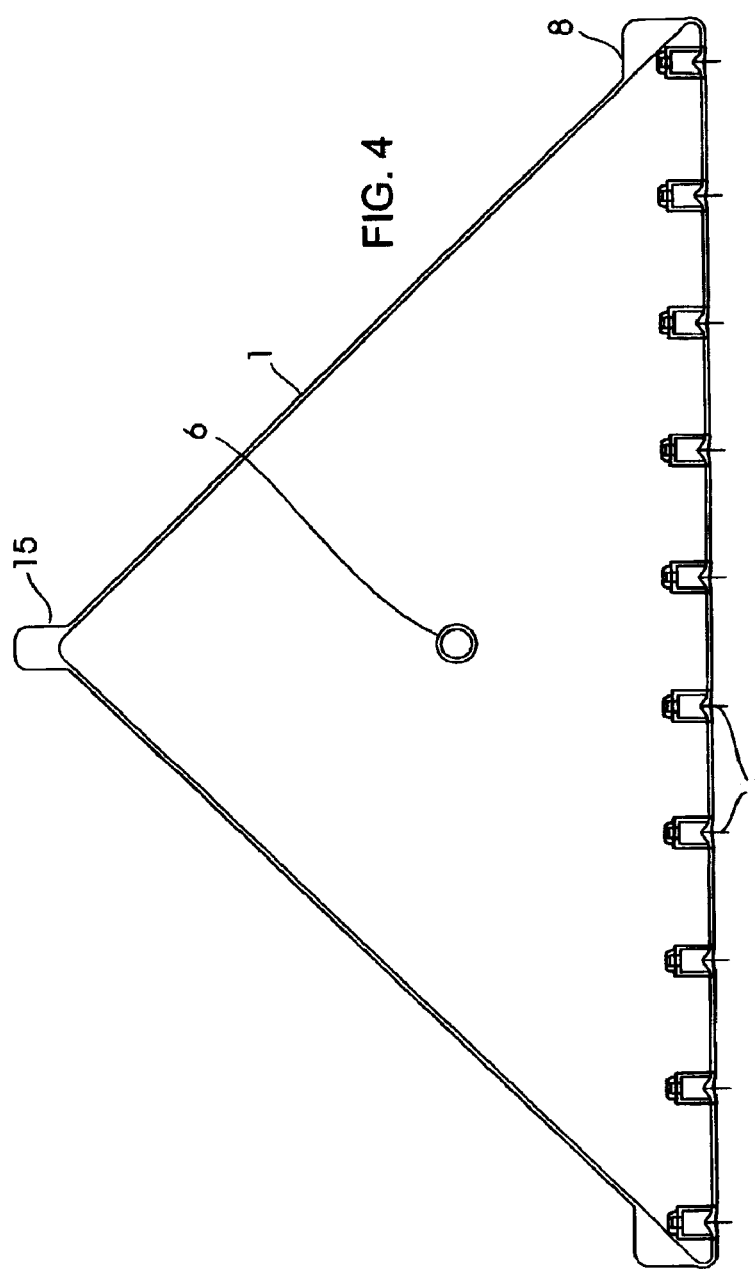
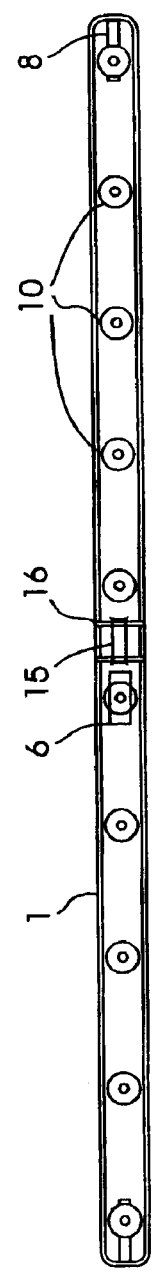

LIVESTOCK DRINKING DEVICE

The present invention relates to a device for allowing livestock and particularly birds such as poultry and game birds to drink.

Conventional drinkers for livestock such as poultry and game birds comprise substantially bell shaped devices, which are suspended in a livestock feeding area. Water is fed to the top of the device over the surface of the bell shape so that it comes to rest in an annular trough around the base of the bell. Birds can then drink from the trough. However, during use, the trough and the surface of the device over which water flows becomes heavily contaminated, leading to a risk of infection. Furthermore, the bell shape is rather bulky, and so reduces the stockman's visibility of birds within the feeding area. Continued vigilance is helpful to ensure that particular birds are not in difficulties or failing to drink appropriately. It is known for example, for small chicks to drown in even quite small drinking troughs or wells.

Yet another problem with such devices is that the water is not visible to the birds. Birds and in particular chicks, often require visual stimulus such as light reflected off water droplets, for them to drink.

An alternative arrangement utilises a series of horizontally arranged tubes, which are arranged at a appropriate height above the ground, and provided along the length with drinking nipples through which birds can drink. These nipples generally comprise a shaft, arranged to close an opening within the nipple to seal it, and a protruding pin, which contacts the shaft. The shaft may be dislodged from the opening by the pin as a result of the action of a bird pecking at the pin. This allows water, which is fed through the tube, to drip through the opening, in response to the pecking of the bird.

Although such devices prevent contamination to a large degree, they are relatively complex and expensive to install. They have to be fitted at a suitable height to allow the particular birds contained within the feeding area access to the nipples. As the birds grow, it may be necessary to adjust this. There may be difficulties if the feeding area comprises uneven or inclined ground, as this may interfere with the smooth flow of water through the tube. Once in position, the device cannot readily be moved around the feeding area and so the birds must always congregate in same place. Furthermore, they can present a significant trip hazard to stockmen or others entering the livestock feeding area.

According to the present invention there is provided device for delivering liquid to livestock, said device comprising a container for liquid, said container being suspendable within a livestock feeding area, having a substantially flat shape and a plurality of nipples, arranged on a lower surface thereof, such that livestock can drink liquid from within the container via the nipples.

Using the device of the invention, many of the inconveniences of the prior art devices are avoided. In addition, known volumes of liquid can be supplied at any one time, facilitating delivery of known concentrations or dosages of medication or the like.

Furthermore, the container may be a substantially sealed container, which means that the risk of the liquid becoming contaminated during use is minimised. Suitably, the container is a substantially sealed container, for instance with a single opening for a liquid delivery tube. It is suitably of a rigid material.

In order to be suspandable within a livestock feeding area, the container is suitably provided with a suspension element, such as an eye hole which can accommodate a hook or the like. The eye hole may be provided in the body of the container but is preferably provided in a lug which extends from the container, suitably in an upwards direction.

In use, the container is suspended in a livestock feeding area at a suitable distance above the ground, so that the livestock have access to the nipples. The height above the ground may be varied depending upon the particular livestock being supplied in this way, for example by adjusting the height of a support from which the container is suspended, or by suspending the device from a ceiling or roof beam, when the feeding area is undercover. Suitable supports include tripods and the like and these may be provided with the device.

The container is suitably freely suspended in the livestock feeding area. It does not have to be fixed to a wall, fence or other fixed wall structure, and so may be suspended a distance away from such structures, allowing access to the nipples from all sides.

In particular, the device is used to feed livestock comprising birds, such as poultry, like chickens or turkeys, or gamebirds, such as partridge, quail or pheasant.

The container has a substantially flat shape or profile, which means that one dimension of the container is significantly less than the others. In particular, the depth of the container is significantly less than the width or the height. For instance the ratio of the depth:height or width of the container is suitably 1:5 or more, preferably 1:10 or more and more preferably 1:20 or more. This shape allows greater visibility for the stockman, as it may be arranged such that the narrow depth (the flattened side) is facing the entrance to the feeding area. Consequently, a stockman passing the area, would be able to see at a glance, most if not all the birds within the area.

A container with a relatively narrow depth will have an elongate lower surface. Suitably, the lower surface of the container is sufficiently elongate so as to allow a significant number of nipples to be installed, for example from 3 to 30 nipples, and suitably about 6–20.

Furthermore, an elongate feeding area produces less competition amongst birds during feeding than say a round feeder. In addition it prevents birds "huddling" underneath.

Suitably the width of the container will be longer than the height in order to provide a larger feeding area. For instance, typical containers used in the device of the invention will have a depth of from 2–10 cm, and preferably about 3 cm, a height of from 30 cm to 1 m and preferably about 50 cm, and a width of from 50 cm to 150 cm, preferably between 80 to 90 cm.

A particularly preferred shape for the container is a substantially flat triangular shape, but other designs and shapes may be devised.

The container is suitably of a moulded plastics material. If convenient however, it may be constructed in modular form and elements connected together subsequently for example using adhesives and/or sealants, to ensure that it is water-tight. In a particular embodiment, it is blow molded as a single unit.

If required, reinforcing struts or stays may be provided in the container, extending from one wall to the other in particular across the depth of the container. These may prevent bending or other stress effects when the container becomes filled with water.

In a further embodiment the container is of a transparent material, in particular a transparent plastics material such as natural polyethylene (MDPE) or Perspex™. This increases visibility and provides good light transmission.

In an alternative embodiment, the container is of a coloured plastics material, which is opaque to light. This reduces the growth of algae in water in the device and so may be preferable for use outdoors.

Suitably, liquid such as water is gravity fed from a water supply or reservoir through a required delivery tube into the container. The flow of water is suitably controlled by an automatic dispensing valve, such as that described in British Patent No. 904,991. These valves comprise a fulcrumed arm which cooperates with an anvil surface when displaced, so as to squeeze and thereby close a resilient liquid supply tube or conduit. Displacement of the arm depends upon the weight of an item suspended from the arm, and whether this can overcome a counter-balanced weight. The weight at this will happen can be varied, for example by including a slide member on the shank of the arm, which may be fixable in various positions, for example by a clip mechanism. The arm is spring-loaded to ensure that it is normally liquid supply tube or conduit is normally open.

In the present case, the container is suspended from the fulcrumed arm to act as the displacing weight. As water is fed into the container, the weight of the container increases, which increases the downward pressure on the fulcrumed arm, which closes the valve, by compressing the water supply tube which is of a resistant material, thus preventing further flow of water. When the volume of water in the container reduces as it is used, the weight on the fulcrumed arm reduces and the counter-balance arrangement causes the arm to rise, whereupon the valve opens to allow more water to be fed into the container. Particular examples of such valves are sold as Rainbow valves available from Quill Productions (UK) (incorporating the former Rainbow JFN, Ireland).

The valves are preferably adjustable so that the weight of water, which is held within the container at any time, may be varied. For instance, when the device is used to supply liquid to young chicks, it may be helpful to increase the volume of water held within the container. This increases the pressure of liquid on the nipples, resulting in increased leakage in the form of water droplets. The higher the water pressure, the larger the droplets, which form, are likely to be. As explained above, the sight of these droplets will stimulate chicks to drink.

As birds mature, this stimulus becomes less necessary, as mature birds have learnt to peck at the nipples in order to obtain liquid. Therefore, the valve may be adjusted so that the amount of water within the container at any one time is less, reducing leakage from the nipples. This ensures that the surrounding area and litter remains drier.

The amount of liquid held within the container at any one time will also affect the inertia of the device. Preferably, the container will hold sufficient liquid to ensure that it does not sway or move too much in the breeze or wind, or in response to small stimuli, such as those occurring when birds knock into the device, or stockmen or others walk past the device.

This may be controlled using the automatic delivery valve arrangement described above. In addition, fixing lugs may be provided on the side of the device, to allow it to be anchored to a convenient fixed surface, such as a wall or post.

In a further aspect, the invention provides a method for supplying liquid to livestock, said method comprising placing liquid in a device as described above, and placing said device in a livestock feeding area. The device may be used inside for example in a poultry or game bird shed, in which case, it may be suspended from the roof or ceiling via sky hooks or cable ties.

Alternatively, the device may be provided with means such as a tripod, which will allow it to be positioned anywhere, including outside, for example amongst free range poultry. In this case, the container may be suspended from the tripod using hooks or cable ties as are known in the art.

Thus the device of the invention can be flexible in use. It may be adjusted to suit a variety of different livestock, in particular poultry or gamebirds, at differing stages of the development, from chicks to grown birds.

In a particular embodiment, the device can be used to administer a medication to the birds. This may be added to the container so that it is at the required concentration or dosage.

Because the device of the invention is suspended above the ground, it may be used in various situations, including where the ground itself is inclined or undulating.

Maintainance of the device is minimal. The sealed nature of the container means that the nipples are unlikely to become clogged by debris. However, should this be the case, or if nipples become defective, these should be readily replaceable by others. In addition, the nipples may be changed to others with different flow rates, to suit the nature of the livestock being fed at any particular time. For instance, nipples with relatively high flow rates will be best suited for feeding turkeys, whereas lower flow rate nipples may be used for smaller livestock.

The invention will now be particularly described by way of example with reference to the accompanying diagrammatic drawings wherein:

FIG. 4 is a front view of a container of the device of the invention;

FIG. 5 is a side view of a container of the device of the invention; and

FIG. 6 is a view of the lower surface of the container of FIG. 5.

Figure 1:
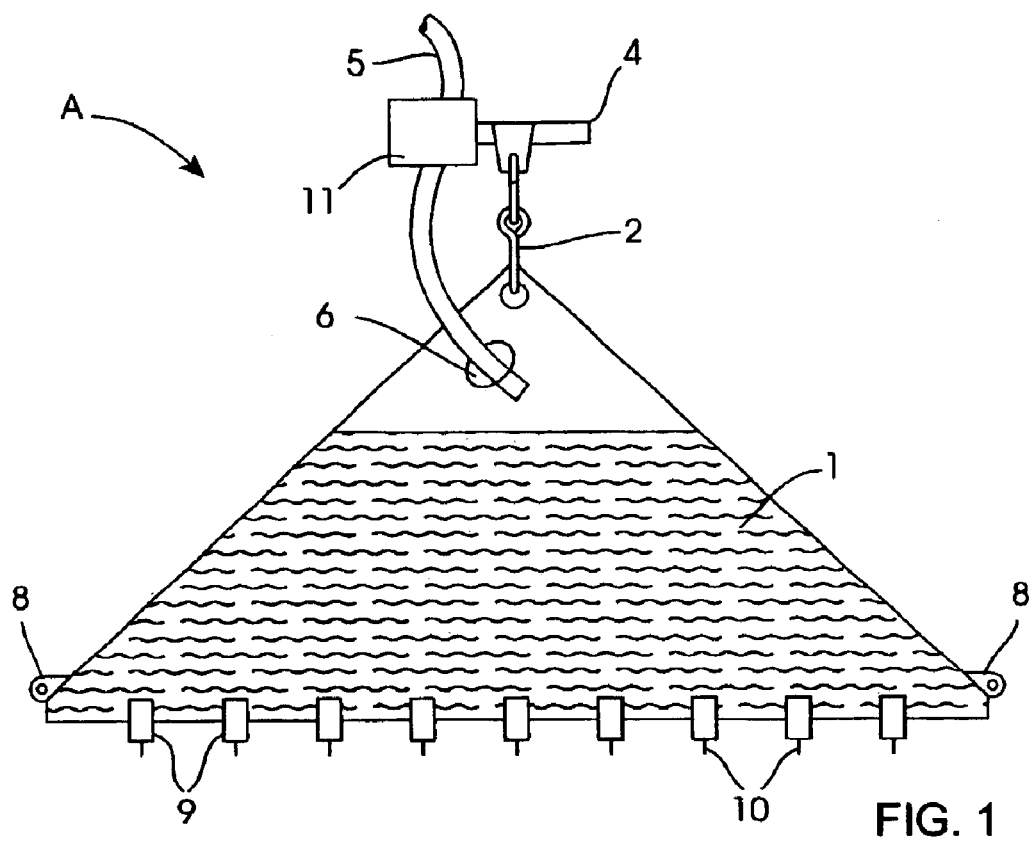
FIG. 1 is a diagrammatic front view of a device of the invention.
Figure 2:
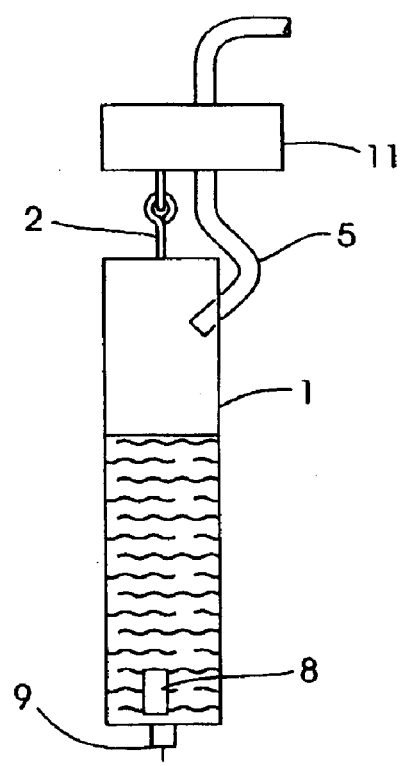
FIG. 2 is a side view of the device of FIG. 1.

The device of the invention (FIG. 1) comprises an essentially triangular container (1) which is water-tight and which is made of a plastics material which may be transparent or opaque depending upon whether it is intended for indoor or outside use. The container (1) has a substantially flat profile (FIG. 2) (not to scale). A hook or cable tie (2) is provided at the top of the container (1), to allow it to be suspended from a fulcrumed arm (4) of a Rainbow valve (11) (shown schematically), which in turn is held on a support (not shown).

Figure 3:
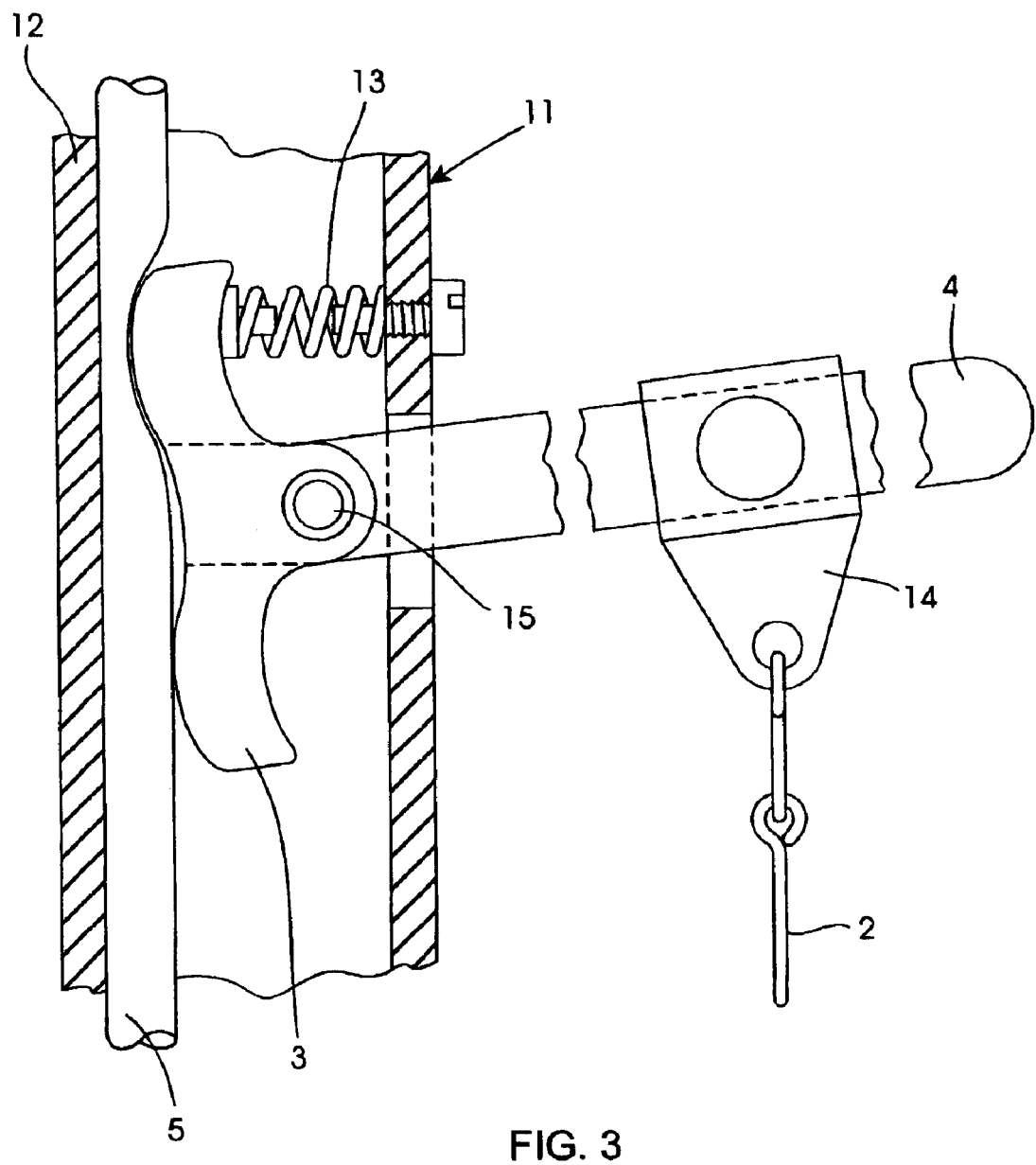
FIG. 3 illustrates a valve used in the device of the invention.

A particular form of a Rainbow valve (11) is shown in partial section in FIG. 3. The fulcrumed arm (4) is provided with a cross member (3) which contacts a resilient liquid supply tube (5). When the arm (4) moves either upwardly or downwardly in response to the addition or removal of a weight applied via the hook (2), one end or the other of the cross member (3) compresses the tube against a rear wall (12) of the valve (11), closing it and preventing water flow. When the arm (4) is evenly balanced, the cross-member (3) is substantially vertical and so the tube (5) is open. A coil-spring (13) is arranged to provide a counterbalancing pressure and to force the arm (4) into the upward position when the arm (4) is unloaded.

The hook or cable tie (2) is connected to the arm (4) by way of an adjustable slide member (14). The position of the slide member (14) along the arm (4) controls the weight at which the valve closes, and can be fixed in a variety of predetermined positions using a clip mechanism (not shown).

When the weight of the container (1) hanging from hook or cable tie (2) is sufficient, the arm (4) rotates about the fulcrum (15) such that the lower surface of the cross-member (3) compresses the resilient liquid supply tube (5) against the wall (12), effectively cutting off the water supply.

The liquid supply tube (5) enters container (1) through an opening (6) provided in an upper region thereof.

In the base of the container (1), are a plurality of downwardly projecting nipples (9) which open to the outside of the container (1). The nipples (9) are suitably of the shaft and pin type, with projecting pins (10). When a bird pecks at the pin, the shaft is dislodged, allowing a droplet of water to escape from the nipple (9). In this way, a limited amount of water is dispensed.

In use, the device is suspended above the ground in a livestock feeding area, so that the narrow profile is presented to the inspection direction, such as the entrance to the area. Water is fed under gravity through the tube (5) into the container (1). If necessary or possible, the device may be anchored to a convenient wall or upright post by way of lugs (8) provided on the sides of the device.

When the weight of water within the container (1) reaches a predetermined level, the arm (4) rotates about the fulcrum sufficiently to result in compression of the supply tube (5). This prevents further water entering the container (1).

Birds may then drink from the nipples (9). As the water is consumed, the weight of water within the container (1) drops, and so the arm (4) will move upwards. In doing so, it reduces the squeezing pressure applied by the cross member (3) to the supply tube (5), so that more water enters the container, ensuring a constant water supply.

Throughout the operation, the water supply is substantially isolated from the surroundings, thus minimising the risk of contamination from the detritus from the birds and elsewhere in the stockyards.

If the birds being fed are small chicks, the container (1) is suspended at only a small distance above the ground, so that the chicks can reach the nipples (9). Furthermore, the Rainbow valve (11) may be set such that the container will fill to a high level, ensuring that there is a considerable water pressure on the nipples (9), resulting in-significant leakage and drip formation. The sight of the drips will stimulate the chicks to drink.

As the chicks grow, or the device is used for other birds, the requirement to present visible drips of water diminishes so that the control mechanism may be adjusted to ensure that less leakage through the nipples (9) occurs. Furthermore, the height of the nipples may be readily further adjusted by altering the height of the support.

If necessary, medication or feed supplements may be added to the water within the container (1).

The container (1) of FIG. 4 is of substantially triangular shape. It is blow molded as a single unit with the nipples (10) fitted into the lower surface as before.

As well as anchoring lugs (8), it is provided with a suspension lug (15), to which a hook or cable tie may be attached.

In this case the hole (6) is provided in a front face of the container.

In an alternative embodiment (FIG. 5), the hole (6) is provided in a sidewall of the container (1), which is transparent. Again, the container (1) is blow molded as a single unit, and in this case, a reinforcing strut (16) is provided and extends between the front and rear walls of the container (1). This strengthens the container and prevents distortion as a result of the introduction of liquid. Again nipples (10) are included in the lower surface of the container (1) (FIG. 6).

The device of the invention thus provides an easy to use but essentially safe drinker for birds of many sizes and ages.

What is claimed is:

1. A device for delivering liquid to livestock, said device comprising a container for liquid, said container being freely suspended in use within a livestock feeding area, having a substantially flat shape and a plurality of nipples, arranged on a lower surface thereof, such that livestock can drink liquid from within the container via the nipples, said device including a suspension element located generally above the nipples, said suspension element being contained in a vertical plane defined within a suspension region between the outermost nipples, said suspension element being located adjacent an uppermost end of the container.

2. A device according to claim 1 wherein the container is a substantially sealed container with a single opening for a liquid supply tube.

3. A device according to claim 1 wherein the ratio of depth:height or width of the container is 1:5 or more.

4. A device according to claim 1 wherein the lower surface of the container is elongate and nipples are distributed along the length thereof.

5. A device according to claim 1 wherein the container is a substantially flat triangular shape.

6. A device according to claim 1 wherein the container is of a transparent material.

7. A device according to claim 1 wherein the container is of an opaque material.

8. A device according to claim 1 which further comprises an automatic dispensing valve arranged to control the flow of water into the container.

9. A device according to claim 8 wherein the valve is controllable automatically in response to the weight of the container.

10. A device according to claim 9 wherein the valve is adjustable so that the weight of water, which is held within the container at any time, may be varied.

11. A device according to claim 1 further comprising a support from which the container may be suspended.

12. A method for supplying liquid to livestock, said method comprising placing liquid in a device as claimed claim 1, and placing said device in a livestock feeding area.

13. A method according to claim 12 wherein the liquid contains a medication.

* * * * *